United States Patent [19]
Kim

[11] Patent Number: 5,812,171
[45] Date of Patent: Sep. 22, 1998

[54] APPARATUS AND METHOD FOR INPUTTING CHARACTERS AND SYMBOLS USING A COMBINATION OF NUMERIC KEYS

[75] Inventor: Sung-Hyun Kim, Gumi, Rep. of Korea

[73] Assignee: SamSung Electronics Co., Ltd., Suwon, Rep. of Korea

[21] Appl. No.: 662,327

[22] Filed: Jun. 12, 1996

[30] Foreign Application Priority Data

Jun. 12, 1995 [KR] Rep. of Korea ................. 1995-15384

[51] Int. Cl.[6] ...................................... G09G 5/00
[52] U.S. Cl. ........................................... 345/168; 345/172
[58] Field of Search ..................................... 345/168, 169, 345/172; 400/472; 364/709.16; 348/734; 341/23

[56] References Cited

U.S. PATENT DOCUMENTS

4,117,542   9/1978   Klausner et al. ..................... 345/169

OTHER PUBLICATIONS

*Canon Laser Class 7000/7500 facsimile*instruction book.
*Canon FAX–L770 facsimile*instruction book.
TradeDirect instruction pamphlet from Waterhouse Securities, p. 7, Sep. 24, 1994.

*Primary Examiner*—Jeffery Brier
*Attorney, Agent, or Firm*—Robert E. Bushnell, Esq.

[57] ABSTRACT

The present invention provides an apparatus and method, for a terminal equipment such as a facsimile device, wherein a character or symbol to be entered and/or displayed is read from a memory according to an index value generated in response to the sequential input of two numeric keys.

10 Claims, 3 Drawing Sheets

APPARATUS AND METHOD FOR INPUTTING CHARACTERS AND SYMBOLS USING A COMBINATION OF NUMERIC KEYS

CROSS REFERENCE TO RELATED APPLICATIONS

This application makes reference to, incorporates the same herein, and claims all benefits accruing under 35 U.S.C §119 from an application entitled *Method Of Inputting Characters Through Combination Of Numeric Keys* earlier filed in the Korean Industrial Property Office on 12 Jun. 1995, which was duly assigned Ser. No. 15384/1995 by that Office.

BACKGROUND OF THE INVENTION

1. Field of the Invention

The present invention relates to a method of using a combination of keys for inputting a character, and more particularly, an apparatus and method for entering characters and symbols using a combination of numeric keys on a key pad of an image formation device.

2. Background Art

In general, terminal telecommunications equipment such as that used in a telephone system or a facsimile system may be programmed to input characters by using the numeric keys of the key pad. In one contemporary system, in order to input different characters, symbols and numbers, respective ones of the numeric keys, asterisk (*) key and pound (#) key of the key pad have to be pressed a set number of times as shown in the following Table 1:

TABLE 1

|  | 0 | 1 | 2 | 3 | 4 | 5 | 6 | 7 | 8 | 9 | * | # |
|---|---|---|---|---|---|---|---|---|---|---|---|---|
| once | , | Q | A | D | G | J | M | P | T | W | ( | [ |
| twice | - | Z | B | E | H | K | N | R | U | X | ) | ] |
| three times | / | BLANK | C | F | I | L | O | S | V | Y | ? | ! |
| four times | 0 | 1 | 2 | 3 | 4 | 5 | 6 | 7 | 8 | 9 | * | # |

As shown in Table 1, numbers, symbols and characters are entered into a resident memory according to the number of times a corresponding key is pressed. For example, when the numeric key "0" is pressed once, the symbol "," is entered, when it is pressed twice, the symbol "-" is entered, when it is pressed three times, the symbol "/" is entered, and when it is pressed four times, the numeral "0" is entered. Similarly, when the numeric key "2" is pressed once, the character "A" is entered, when, it is pressed twice, the character "B" is input, when it is pressed three times, the character "C" is entered, and when it is pressed four times, the numeral "2" is entered.

In the conventional system as described above, since the symbol and character are entered into a resident memory according to the number of times each numeric key is manually depressed by a user, I have found that there is a disadvantage however, because in order to input several of the symbols, characters or numbers, a numeric key may have to be manually depressed three or four times in quick sequence by the user.

Also, it is thought from the text of a Canon® Laser Class 7000/7500 facsimile instruction book that characters can be entered by pressing a set key twice to start the letter entry mode, and then by pressing the corresponding numeric key one to three times. Additionally, in order to enter a symbol, while in the letter entry mode, the pound (#) key is repeatedly pressed until the desired symbol is displayed. To switch from the letter entry mode to a number entry mode the asterisk (*) key is pressed. Furthermore, corrections can be made using a "space" key or a "clear" key. Accordingly, I have noticed that the Canon® Laser Class 7000/7500 facsimile also has a disadvantage in that the numeric keys have to be pressed three times in order to enter several of the corresponding characters. Also, there is a disadvantage wherein a "▶" key must be pressed in order to input each succeeding character or symbol.

It is further thought from the text of a Canon® FAX-L770 facsimile user's instruction book that characters can be entered by selecting one of four "lists" of characters, symbols and numbers, by pressing the number "5" key. Then, one can scroll through the selected list using numeric keys "2", "4", "6", and "8", and once the desired letter appears on a display, the user pressesd a "cursor" key to enable entry of a next character, symbol or number. For example, when desiring to enter the letter "x", one would press the "5" key twice, then press the "8" key four times and then depress the "6" key three times. I have found that the Canon® FAX-L770 facsimile device has a disadvantage in that in order to display most of the characters and symbols the user must use a combination of three or four keys and must press several of these keys a plurality of times.

SUMMARY OF THE INVENTION

Accordingly, it is an object of the present invention to provide an improved character entry circuit and process.

It is another object to provide a circuit and process for entry of symbols and characters into a resident memory by combining two numeric keys without repeatedly pressing a numeric key a plurality of times.

To achieve these and other objects, the present invention provides an apparatus and method, for terminal telecommunications equipment such as a facsimile device, wherein a character or symbol to be entered and/or displayed is read from a memory according to an index value generated in response to the sequential input of two numeric keys.

BRIEF DESCRIPTION OF THE DRAWINGS

A more complete appreciation of the invention, and many of the attendant advantages thereof, will be readily apparent as the same becomes better understood by reference to the following detail description when considered in conjunction with the accompanying drawings in which like reference symbols indicate the same or similar components, wherein.

DETAILED DESCRIPTION OF THE PREFERRED EMBODIMENT

Figure 1:
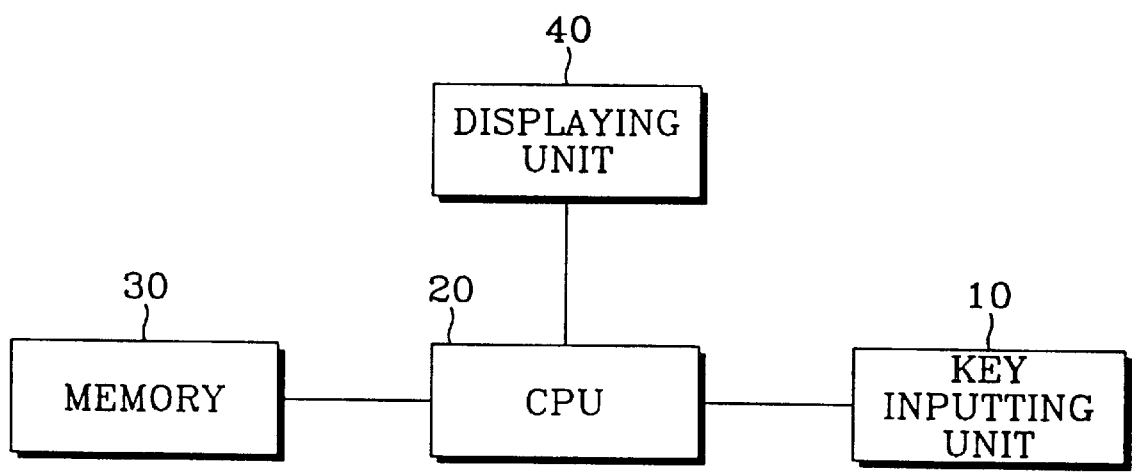
FIG. 1 is a block diagram illustrating a structure of an apparatus constructed according to the principles of the present invention.
Figure 2A:
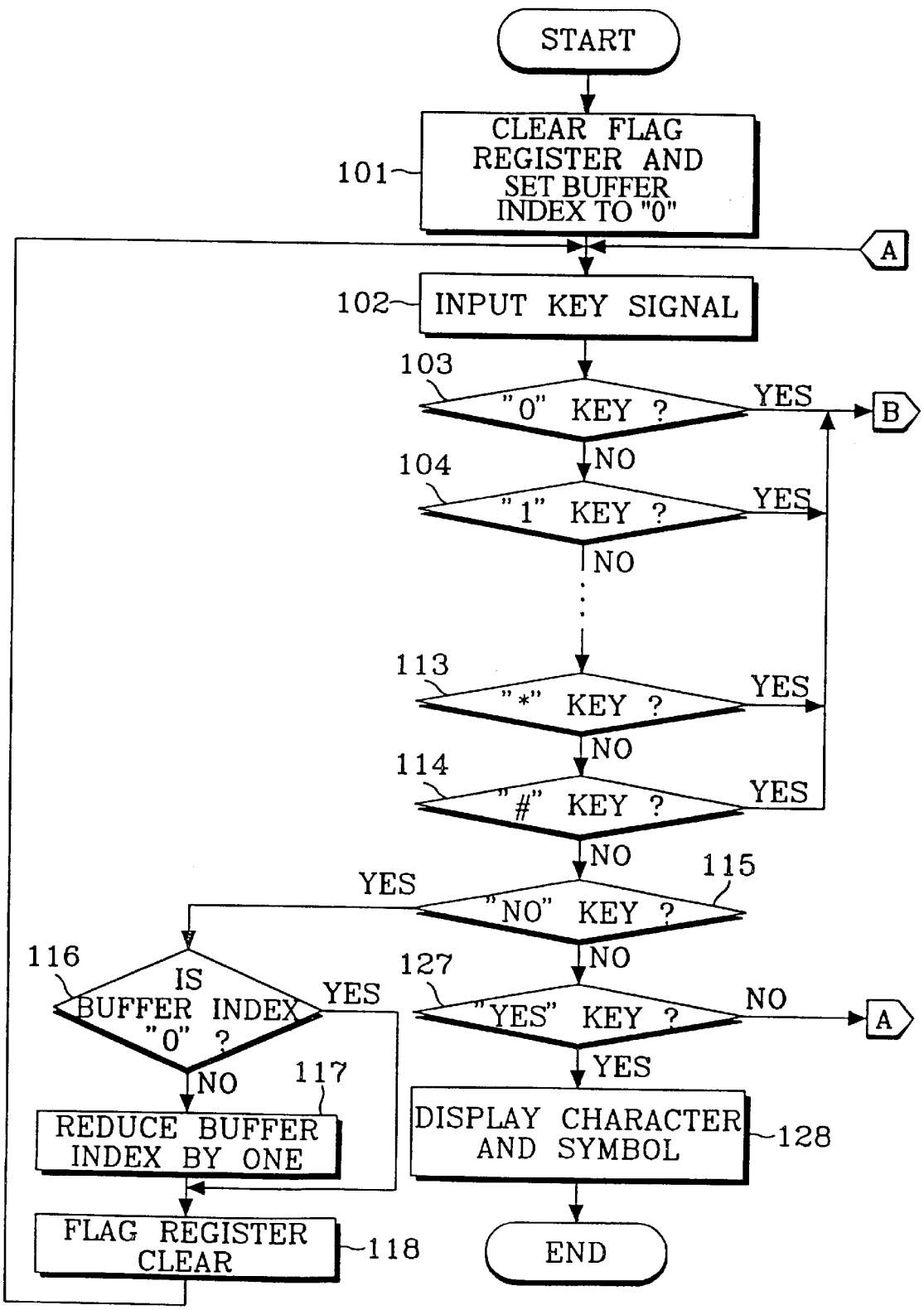
FIGS. 2A and 2B illustrate, by way of a flowchart, several steps of a process for controlling the generation of characters and symbols in response to the sequential input of two numeric keys according to the principles of the present invention.
Figure 2B:
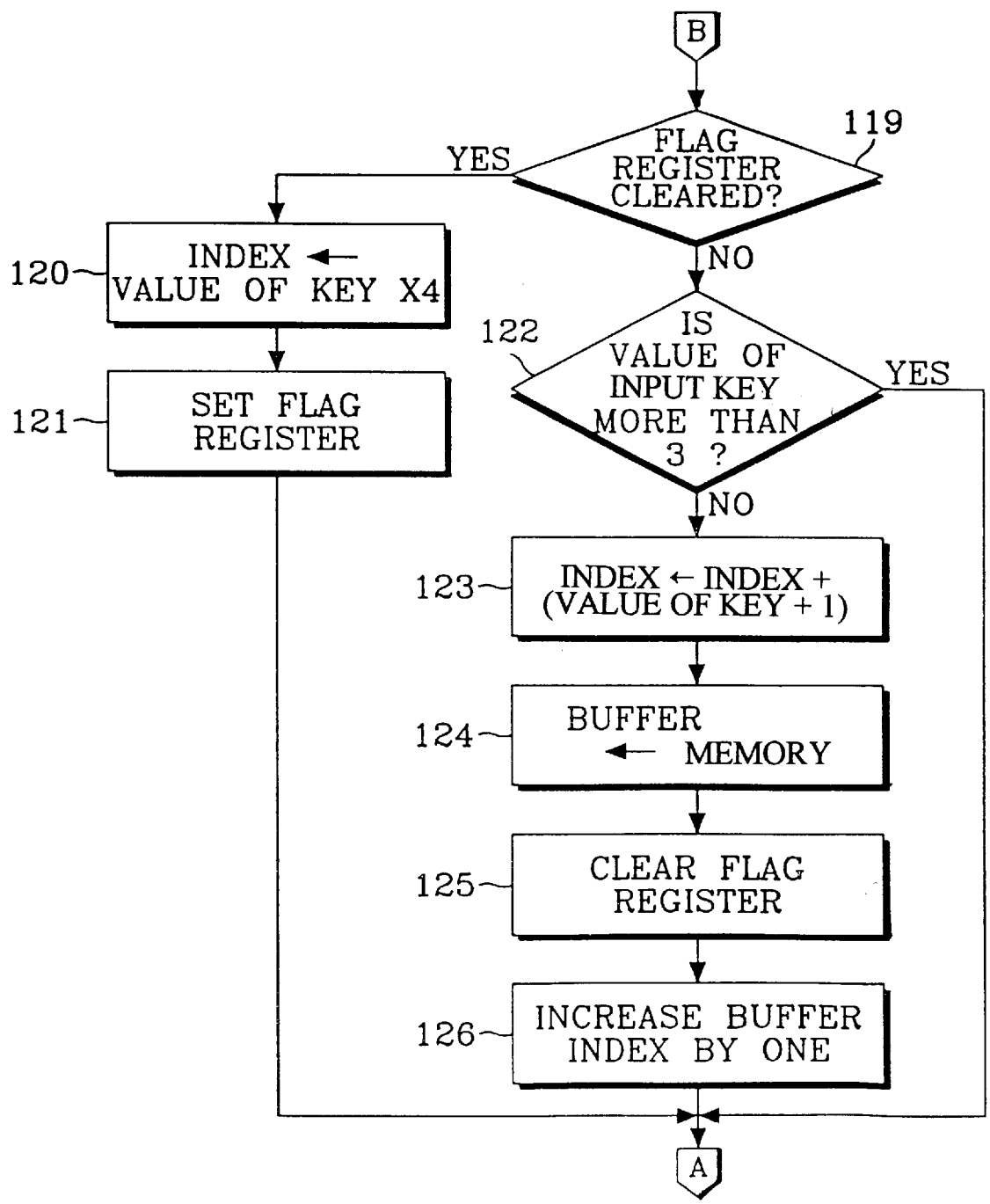

Turning now to the drawings, FIG. 1 shows a key entry unit 10 having a plurality of keys for generating a combined key signal for entry by a user of characters and symbols into a resident memory 30, and a numeric key signal. A control unit (CPU) 20 outputs character data and symbol data in response to inputs of the combined key signal and the numeric key signal from the key entry unit 10. Resident memory 30 stores character data and symbol data, and a program for generating characters and symbols under the control of control unit 20. A variable visual display unit 40 displays information about various kinds of numerals, characters and symbols under the control of control unit 20. FIGS. 2A and 2B illustrate a flowchart, with further reference to FIG. 1, for the control operations to be followed in order to generate characters and symbols in response to the sequential entry of a combination of numeric keys in accordance with the principles of the present invention.

In FIG. 2A, "START" represents when a user initiates the mode for generating characters and symbols. Accordingly, the following description concerns the character/symbol generating mode and not a mode for dialing a telephone number. In step 101, a FLAG register (not shown) and a BUFFER INDEX register (not shown) are cleared by setting the values of these registers to "0". These registers will be further explained below. In step 102, the control unit 20 checks for an input key signal in response to activation any one of a plurality of keys on the key inputting unit 10. Control unit 20 then determines, steps 103–114 whether the input key signal from key inputting unit 10 is one of the numeric keys (0–9), an asterisk (*) key or a pound (#) key and then, if the inputted key is one of the numeric keys (0–9), an asterisk (*) key or a pound (#) key, proceeds to step 119.

In step 119, control unit 20 checks the value of the FLAG register in order to determine whether the FLAG register is in a cleared state. When the FLAG register is in a cleared state, control unit 20 multiplies the value of the key by 4 and stores the result in an INDEX register (not shown), and then, in step 121, changes the FLAG register to a set state. Control unit 20 then returns to step 102.

Note here that the characters and symbols are generated through a two key combination of the numeric keys, the asterisk (*) key and the pound (#) key as shown in the following Table 2:

TABLE 2

|   | 0 | 1 | 2 | 3 | 4 | 5 | 6 | 7 | 8 | 9 | * | # |
|---|---|---|---|---|---|---|---|---|---|---|---|---|
| 0 | 0 | 1 | 2 | 3 | 4 | 5 | 6 | 7 | 8 | 9 | * | # |
| 1 | , | Q | A | D | G | J | M | P | T | W | ( | [ |
| 2 | - | Z | B | E | H | K | N | R | U | X | ) | ] |
| 3 | / | BLANK | C | F | I | L | O | S | V | Y | ? | ! |

Accordingly, when the FLAG register is in the cleared state the value of the key represented by the first horizontal row in Table 2, i.e., numeric keys (0–9), the asterisk (*) key and the pound (#) key, is multiplied by 4 in step 120. The numeric keys (0–9) will have their corresponding values 0–9, the asterisk (*) key will have a value 10 and the pound (#) key will have a value 11.

Following the return to step 102 after the FLAG register has been set, control unit 20 again checks for an input key signal in response to a subsequent activation any one of the plurality of keys on the key inputting unit 10. Control unit 20 then determines, steps 103–114 whether the input key signal is one of the numeric keys (0–9), an asterisk (*) key or a pound (#) key and then, if the inputted key is one of the numeric keys (0–9), an asterisk (*) key or a pound (#) key, proceeds to step 119.

During step 119, control unit 20 checks the value of the FLAG register in order to determine whether the FLAG register is in a cleared state. When the FLAG register is not in a cleared state, control unit 20 proceeds to step 122. Accordingly, when the FLAG register is in the set state, the value of the key is checked to determine whether it is greater than 3. This step is represented by the first vertical column in Table 2, i.e., numeric keys (0–3). Control unit 20 returns to step 102 when step 122 determines that the activated key is greater than 3.

Control unit 20 proceeds to step 123 when the step 122 determines that the value of the activated key not greater than 3. In step 123, the value of the INDEX register is changed by increasing the value of the activated key by one, and adding this value to the value stored in the INDEX register during step 120. For example, if control unit 20 determines that the first activated key was the "1" key in step 104, and the FLAG register was determined to be in a clear state in step 119, then the value stored in the INDEX register in step 120 will be 1×4=4. Then, following, a return to step 102, if control unit 20 determines that the subsequent activated key was the "1" key in step 104, and that the FLAG register was not in a clear state in step 119, then the value of the "1" key will be increased by one, i.e., 1+1=2, and added to the value 4 stored in the INDEX register in step 120, i.e., 2+4=6, thus resulting in a value of 6 being stored in the INDEX register in step 123. Note here that the value 6 corresponds to the character Q stored in memory 30. Similarly, if the user desired to input the character U, then the first key to be activated would be the "8" key, resulting in a value of 32 being stored in the INDEX register in step 120, and the subsequent key to be activated would be the "2" key resulting in a value of 35, i.e., (2+1)+32, being stored in the INDEX register in step 123.

In step 124, control unit 20 reads out the character/symbol data stored in memory 30 corresponding to the value of the INDEX register obtained in step 123, and stores this character/symbol data in a buffer (not shown) according to the value of the BUFFER INDEX register. Since the BUFFER INDEX register was set to "0" in step 101 when the character/symbol generating mode was started, then the first character/symbol read from memory 30 will be stored in the initial, or first, position of the buffer. Control unit 20 then clears the FLAG register in step 125 and increases the value of the BUFFER INDEX register by one in step in step 126. Accordingly, the BUFFER INDEX register points to a position in the buffer where the character/symbol data, read from memory 30 in response to the value of the INDEX register, is to be stored.

Key inputting unit 10 also incorporates a "NO" key and a "YES" key, and when control unit 20 determines that the input key signal, step 102, is not one of the numeric (0–9) keys, the asterisk (*) key and the pound (#) key, control unit determines in step 115 whether it is the "NO" key. The "NO" key is a backup, or erase, key. When control unit 20 detects the "NO" key in step 115, the BUFFER INDEX register is checked in step 116 to determine whether it has a value of "0". If the BUFFER INDEX register is set to "0" then control unit 20 performs step 118. In step 118, control unit 20 clears the FLAG register. If the BUFFER INDEX register has a value greater than "0" then the value in the BUFFER INDEX register is decreased by one in step 117 so that the character/symbol data next read from memory 30 will overwrite the last character/symbol data stored in the buffer and then step 118 is performed. Accordngly, the user can re-enter the last character/symbol or, by repeatedly entering the "NO" key, re-enter all the character/symbol data. In step 118, control unit 20 clears the FLAG register.

Control unit 20 determines in step 127 whether the input key signal of step 102 corresponds to the "YES" key when it is determined that the input key signal, step 102, is not one of the numeric (0–9) keys, the asterisk (*) key, the pound (#) key and the "NO" key. When it is determined in step 127 that the "YES" key has not been activated, control unit 20 returns to step 102. When it is determined in step 127 that the "YES" key has been activated, control unit 20 reads out the character/symbol data stored in the buffer and displays the characters/symbols on display unit 40.

As shown in Table 2, and as described above, when two numeric keys are pressed or one numeric key and either one of the asterisk (*) key and the pound (#) key are pressed, the corresponding character or symbol is generated to be displayed. For example, if the numeric keys "00" are pressed, the numeral 0 is displayed, if the numeric keys "01" are pressed, the symbol, is displayed, if the numeric keys "02" are pressed, the symbol – is displayed, and if the numeric keys "03" are pressed, the symbol / is displayed. Similarly, if the keys "#0" are pressed, the symbol # is displayed, if the keys "#1" are pressed, the symbol [ is displayed, if the keys "#2" are pressed, the symbol ] is displayed, and if the numeric keys "#3" are pressed, the symbol ! is displayed.

For instance, when the user desires to input the characters "TELEPHONE NUMBER", the combined numeric keys "81", "32", "53", "32", "71", "42", "63", "62", "32", "31", "62", "82", "61", "22", "32", "72" are input and the character/symbol data corresponding to the characters/symbols T, E, L, E, P, H, 0, N, E, BLANK, N, U, M, B, E, R are stored in the buffer. Then, when the "YES" key is input, the characters "TELEPHONE NUMBER" are displayed.

As discussed previously, in the system contemplated by the principles of the present invention, characters and symbols can be input by combining any one of numeric keys (0–9) asterisk (*) key and the pound (#) key with any one of numeric keys 0–3. Accordingly, the only keys which may have to be input more than once but not more than twice, of the numeric keys (0–9), the asterisk (*) key or the pound (#) key, would be numeric keys 0–3. Accordingly, there is an advantage in that the fewer key manipulations are required in order to enter alphanumeric characters and other symbols.

What is claimed is:

1. A method of inputting characters by combining two keys in a system using a key pad having numeric keys 0–9, an asterisk key and a pound key, said method comprising the steps of:

inputting a first key signal by activating one of said numeric keys 0–9, said asterisk key and said pound key;

determining whether said first key signal is indicative of the activation of one of said numeric keys 0–9, said asterisk key and said pound key;

storing a first index value in an index register by multiplying a value of the activated one of said numeric keys 0–9, said asterisk key and said pound key by 4, when it is determined that said first key signal is indicative of the activation of one of said numeric keys 0–9, said asterisk key and said pound key;

inputting a second key signal by activating one of said numeric keys 0–3;

determining whether said second key signal is indicative of the activation of one of said numeric keys 0–9, said asterisk key and said pound key;

determining whether a value of the activated one of said numeric keys 0–9, said asterisk key and said pound key is greater than 3, when it is determined that said second key signal is indicative of the activation of one of said numeric keys 0–9, said asterisk key and said pound key;

returning to said step of determining whether said second key signal is indicative of the activation of one of said numeric keys 0–9, said asterisk key and said pound key, when it is determined that said activated one of said numeric keys 0–9, said asterisk key and said pound key has a value greater than 3;

storing a second index value in said index register by obtaining a sum value by adding one to the value of the activated one of said numeric keys 0–3 and then adding said first index value to said sum value, when it is determined that said activated one of said numeric keys 0–9, said asterisk key and said pound key has a value not greater than 3;

reading out, from a memory, character data corresponding to said second index value; and displaying a character corresponding to said character data read out from said memory.

2. The method as set forth in claim 1, further comprising the steps of:

clearing a flag register and setting a buffer index register to "0" prior to inputting said first key signal;

checking a state of said flag register when it is determined that said first key signal is indicative of the activation of one of said numeric keys 0–9, said asterisk key and said pound key; and performing said step of storing a first index value when it is determined that said state of said flag register is a cleared state, and then changing said state of said flag register prior to inputting said second key signal.

3. The method as set forth in claim 2, further comprising the steps of:

checking a state of said flag register when it is determined that said second key signal is indicative of the activation of one of said numeric keys 0–9, said asterisk key and said pound key;

performing said step of determining whether said activated one of said numeric keys 0–9, said asterisk key and said pound key is greater than 3, when it is determined that said state of flag register is not a cleared state;

performing said step of storing a second index value in said index register by obtaining a sum value by adding one to the value of the activated one of said numeric keys 0–3 and then adding said first index value to said sum value, when it is determined that said activated one of said numeric keys 0–9, said asterisk key and said pound key has a value not greater than 3 storing said character data read from said memory into a storage area of a buffer, said storage area corresponding to a value of said buffer index register;

clearing said flag register; and increasing a value of said buffer index register by one.

4. The method as set forth in claim 3, said key pad having a NO key and a YES, said method further comprising the steps of:

determining whether said NO key has been activated; and erasing character data stored in said buffer when said NO key is activated;

determining whether said YES key has been activated when it is determined that said NO key has not been activated; and displaying characters corresponding to said character data stored in said buffer when said YES key has been activated.

5. A method of inputting characters by combining two keys in a system using a key pad having numeric keys 0–9, an asterisk key, a pound key, a NO key and a YES key, said method comprising the steps of:

receiving a first input key signal;

determining whether said first input key signal is one of said numeric keys 0–9, said asterisk key and said pound key;

checking a state of a flag register to determine whether said flag register is in a cleared state, when it is determined that said first input key signal is one of said numeric keys 0–9, said asterisk key and said pound key;

obtaining a first index value by multiplying a value of said one of said numeric keys 0–9, said asterisk key and said pound key by four, when said flag register is in said cleared state and then changing the state of said flag register to a set state;

receiving a second input key signal;

determining whether said second input key signal is one of said numeric keys 0–9, said asterisk key and said pound key;

determining whether said flag register is in said set state, when it is determined that said second input key signal is one of said numeric keys 0–9, said asterisk key and said pound key;

determining whether a value of said second key signal is greater than three, when said flag register is in said set state;

increasing said value of said second key signal by one;

obtaining a second index value by adding said first index value to said value of said second key signal increased by one, when it is determined that said value of said second key signal is not greater than three;

reading character data from a memory in response to said second index value;

storing said character data in a storage area of a buffer, said storage area being identified by a value stored in a buffer index register;

increasing by one said value stored in said buffer index register;

converting said character data stored in said buffer to a corresponding character in response to an input of said YES key; and displaying said character.

6. The method as set forth in claim 5, further comprising the steps of:

determining whether said NO key has been activated, when it is determined that either one of said first input key signal and said second input key signal does not correspond to one of said numeric keys 0–9, said asterisk key and said pound key;

determining whether said value of said buffer index register is a predetermined minimum value, when it is determined that said NO key has been activated;

reducing said value of said buffer index register, when it is determined that said value of said buffer index register is not said predetermined minimum value and setting said flag register to said cleared state; and setting said flag register to said cleared state when it is determined that said value of said buffer index register is not said predetermined minimum value.

7. The method as set forth in claim 6, further comprising the steps of:

determining whether said YES key has been activated, when it is determined that said NO key has not been activated.

8. A method of inputting characters in a facsimile system using a key pad having numeric keys 0–9, an asterisk key, a pound key, a NO key and a YES key, said method comprising the steps of:

clearing a flag register;

setting a value in a buffer index register to zero;

receiving an input key signal;

determining whether said input key signal is one of said numeric keys 0–9, said asterisk key and said pound key;

checking a state of said flag register to determine whether said flag register is in a cleared state or a set state, when it is determined that said input key signal is one of said numeric keys 0–9, said asterisk key and said pound key;

obtaining a first index value by multiplying a value of said input key signal by four, when it is determined that said flag register is in said cleared state;

returning to said step of receiving an input key signal, after changing said flag register to said set state;

changing said flag register to said set state after obtaining a first index value;

determining whether a value of said input key signal is greater than three, when it is determined that said flag register is in said set state;

obtaining a second index value by adding one to said value of said input key signal, when said value of said input key signal is not greater than three;

obtaining a third index value by adding said first index value to said second index value;

reading character data from a memory in response to said third index value;

storing said character data in a storage area of a buffer, said storage area being identified by said value of said buffer index register;

increasing by one said value of said buffer index register, after storing said character data; and returning to said step of receiving an input key signal, after increasing by one said value of said buffer index register.

9. The method as set forth in claim 8, further comprising the steps of:

determining whether said NO key has been activated, when it is determined that said input key signal is not one of said numeric keys 0–9, said asterisk key and said pound key;

determining whether said value of said buffer index register is equal to zero, when it is determined that said NO key has been activated;

erasing character data in said storage area of said buffer corresponding to said value of said buffer index register by reducing said value of said buffer index register by one, when it is determined that said value of said buffer index register is not equal to zero and setting said flag register to said cleared state; and setting said flag register to said cleared state when it is determined that said value of said buffer index register is equal to zero.

10. The method as set forth in claim 9, further comprising the steps of:

determining whether said YES key has been activated, when it is determined that said NO key has not been activated;

converting said character data stored in said buffer to a corresponding character in when it has been determine that said YES key has been input; and displaying said character.

* * * * *